(12) United States Patent
Takahashi

(10) Patent No.: US 7,373,834 B2
(45) Date of Patent: May 20, 2008

(54) PRESSURE SENSOR

(75) Inventor: Mitsuasa Takahashi, Kanagawa (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 0 days.

(21) Appl. No.: 11/586,512

(22) Filed: Oct. 26, 2006

(65) Prior Publication Data

US 2007/0095148 A1    May 3, 2007

(30) Foreign Application Priority Data

Oct. 27, 2005    (JP) .............................. 2005-313560

(51) Int. Cl.
*G01L 9/00*    (2006.01)
(52) U.S. Cl. ....................................................... 73/754
(58) Field of Classification Search .................. 73/754, 73/724, 862.04
See application file for complete search history.

(56) References Cited

U.S. PATENT DOCUMENTS 5,259,247 A * 11/1993 Bantien ........................ 73/718

FOREIGN PATENT DOCUMENTS

| JP | 56-027630 A | 3/1981 |
|---|---|---|
| JP | 11-259234 A | 9/1999 |

\* cited by examiner

*Primary Examiner*—Jewel Thompson
(74) *Attorney, Agent, or Firm*—Sughrue Mion, PLLC

(57) ABSTRACT

A lower capacitive electrode and a capacitive electrode of an opposite substrate are provided to mutually facing surfaces of a TFT substrate and the opposite substrate, respectively; and a seal member is provided to the peripheral part of both substrates. The seal member creates a predetermined gap between the substrates, and the surrounded space is sealed by the seal member. A pressure sensor measures pressure applied to the substrates based on variations in capacitance between the lower capacitive electrode and the facing-substrate capacitive electrode. An acceleration sensor is incorporated into the TFT substrate within the pressure sensor. The presence of the acceleration sensor inside the pressure sensor thereby eliminates the need for a separate pressure sensor and acceleration sensor, and allows a pressure sensor that improves the moisture resistance of the acceleration sensor to be provided.

5 Claims, 4 Drawing Sheets

PRESSURE SENSOR

BACKGROUND OF THE INVENTION

1. Field of the Invention

The present invention relates to a pressure sensor that has an internally disposed acceleration sensor.

2. Description of the Related Art

Pressure sensor devices have come into use in conjunction with recent technological developments. An example of a known conventional pressure sensor is disclosed in Japanese Laid-Open Patent Application No. 56-27630. FIG. 1 is a cross-sectional view showing a structure of a pressure-sensing element disclosed in Japanese Laid-Open Patent Application No. 56-27630. As shown in FIG. 1, this conventional pressure sensor is formed so that a spacer 101 is disposed between a peripheral part of a pair of facing diaphragms 100, and the diaphragms 100 face each other across a gap of suitable length. The diaphragms 100 are composed of glass, a ceramic material, a metal, or the like. When the diaphragms 100 are not electrically conductive, electrodes (not shown) are provided to the facing inner surfaces. When an external pressure is applied to the diaphragms 100 in such conventional pressure sensors, the diaphragms 100 bend, and the capacitance between the diaphragms 100 gradually increases. The applied pressure can be measured by determining this capacitance. In Japanese Laid-Open Patent Application No. 56-27630, temperature variation in the capacitance itself is suppressed by using a spacer 101 composed of materials having as low a linear expansion coefficient as possible; and temperature variation in the bending amount is suppressed by selecting a suitable material for the diaphragm. A pressure sensor that is minimally susceptible to temperature variation can thereby be obtained.

Additionally, a liquid crystal display device in which a capacitance value-detecting sensor is provided as a pressure-detecting sensor is disclosed in Japanese Laid-Open Patent Application No. 11-259234. In this liquid crystal display device, a display area is configured by placing a liquid crystal layer between a first substrate and a second substrate that are disposed facing each other. This area is provided with a pressure-detecting sensor for detecting pressure applied to pixels and outputting the detection data to the surface of the pixels on the liquid crystal layer side of the first substrate.

However, in the above-described prior art, a separate type of sensor is not incorporated into the pressure sensor. In other words, a pressure sensor and, e.g., an acceleration sensor are provided as separate devices. Examples of such devices include conventional TPMSs (tire pressure monitoring systems). In order to conserve energy in a TPMS, a tire pressure sensing circuit and a data transceiving circuit operate from the time the tires rotate. To measure the pressure, an acceleration sensor for detecting the rotation of the tires must be provided separately.

SUMMARY OF THE INVENTION

An object of the present invention is to provide a pressure sensor that is internally equipped with an acceleration sensor, thereby eliminating the need for a pressure sensor and an acceleration sensor to be separately provided; and that improves the moisture resistance of the acceleration sensor.

The pressure sensor according to the present invention comprises a first substrate; a second substrate disposed facing the first substrate; a seal member for sealing from the exterior a space between the first substrate and second substrate; first and second electrodes which are formed on the facing surfaces of the first substrate and second substrate, respectively, and which detect pressure applied to the first and second substrates as capacitance variation; and an acceleration sensor formed on a surface facing an area surrounding the seal member of the first and second substrates.

In the present invention, first and second electrodes are provided on each of the facing surfaces of, for example, facing insulating substrates, and the space between the two substrates is sealed by the seal member. When pressure is applied to the substrates, the distance between the first and second electrodes changes and the capacitance between the first and second electrodes accordingly also changes. The pressure sensor measures the pressure from these changes in capacitance. In the pressure sensor according to the present invention, an acceleration sensor is embedded within the sealed space surrounded by the seal member. Therefore, the moisture resistance of this acceleration sensor is dramatically improved.

The acceleration sensor has an upper electrode and a lower electrode, has a structure wherein the gap between the upper and lower electrodes is changed according to the degree of acceleration, and can be used as an acceleration sensor for detecting acceleration from the variation in capacitance that accompanies acceleration.

The first and second substrates can also be substrates in which circuit elements and a detection circuit are formed. The first and second substrates can also be TFT (thin film transistor) substrates, and the acceleration sensor can be formed on the TFT substrate.

The circuit elements and the detection circuit comprising the circuit elements are formed in the pressure sensor that is closed off by the first and second substrates and the seal member. The moisture resistance of the circuit elements and the detection circuit comprising the circuit elements is dramatically improved. The same effect can be obtained with the TFT substrate as well.

A temperature sensor can also be formed inside the seal member on the first or second substrate. The moisture resistance of the acceleration sensor and the temperature sensor is improved by disposing both sensors inside the pressure sensor. The temperature sensor can also be formed on the TFT substrate.

DESCRIPTION OF THE PREFERRED EMBODIMENTS

Figure 1:
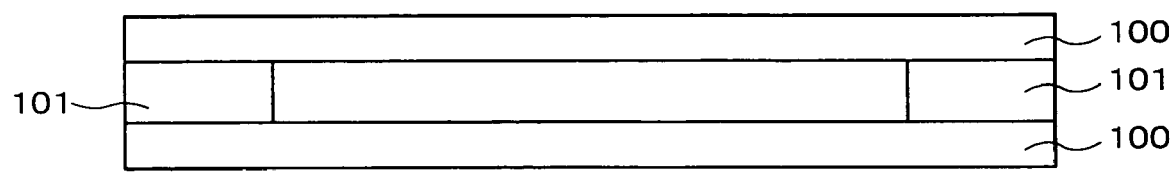
FIG. 1 is a cross-sectional view showing the structure of the pressure-sensing element disclosed in Japanese Laid-Open Patent Application No. 56-27630.
Figure 2:
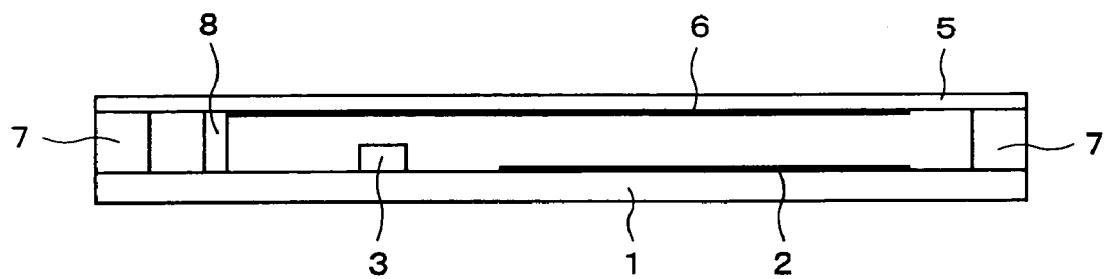
FIG. 2 is a longitudinal cross-sectional view showing a pressure sensor according to a first embodiment of the present invention.
Figure 3A:
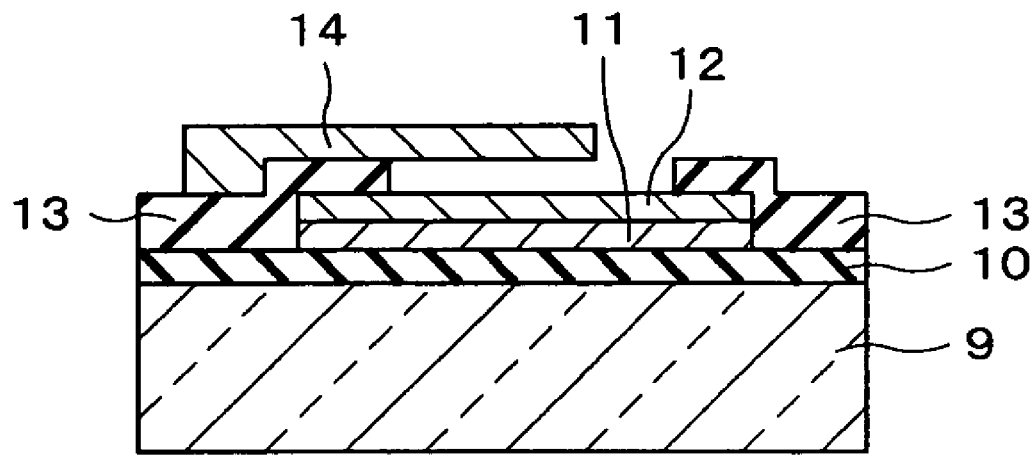
FIG. 3A is a longitudinal cross-sectional view showing the acceleration sensor shown in FIG. 2.
Figure 3B:
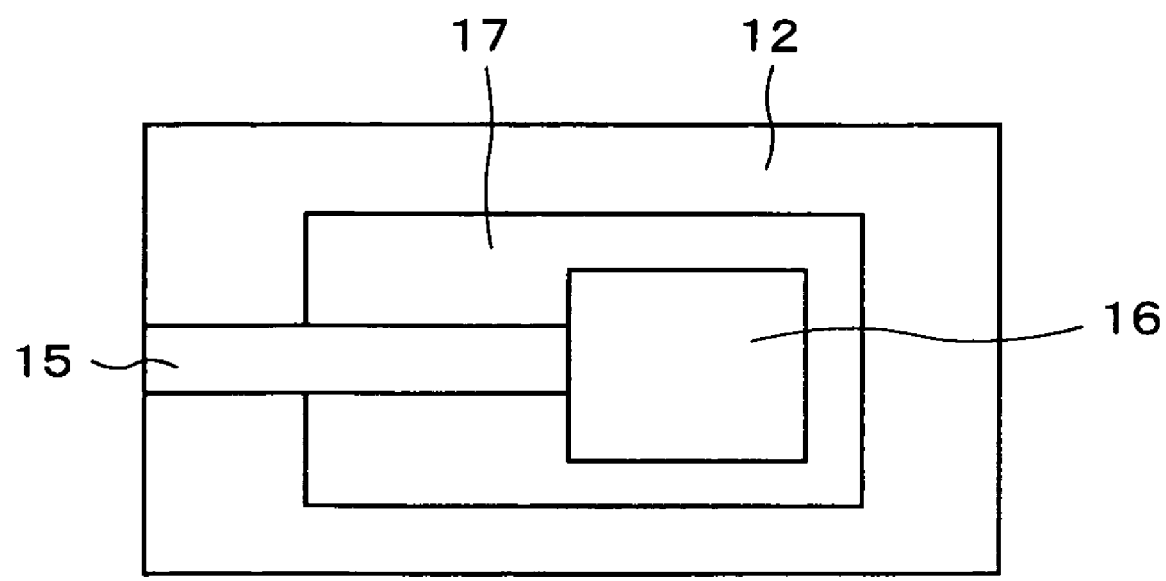
FIG. 3B is a plan view of this acceleration sensor.

Embodiments of the present invention are described in detail hereunder with reference to the accompanying drawings. A first embodiment of the present invention is first described. FIG. 2 is a longitudinal cross-sectional view showing a pressure sensor according to the present embodiment. FIG. 3A is a longitudinal cross-sectional view showing the configuration of the acceleration sensor shown in FIG. 2. FIG. 3B is a plan view of this acceleration sensor.

As shown in FIG. 2, the pressure sensor according to the present embodiment has a TFT substrate 1 and an opposite substrate 5 that are disposed in a mutually parallel fashion; and a seal member 7 is provided between the two substrates. A lower capacitive electrode 2 is provided to the surface of the TFT substrate 1 that faces the opposite substrate 5, and a capacitive electrode 6 of the opposite substrate is provided to the surface of the opposite substrate 5 that faces the TFT substrate 1. The periphery of the TFT substrate 1 and opposite substrate 5 is sealed by the seal member 7 so as to have a predetermined electrode gap. An acceleration sensor 3 that detects acceleration from variations in capacitance caused by acceleration-induced changes in the electrode gap is provided to the TFT substrate 1 within the seal member 7. The capacitive electrode 6 of the opposite substrate is electrically connected with a corresponding electrode pattern of the TFT substrate 1 via a transfer 8. The capacitance or pressure is detected by a detection circuit that is composed of circuit elements, and capacitance or pressure data is transmitted to the exterior by a transmitting circuit.

The configuration of the acceleration sensor 3 and the method for manufacturing same are next described. FIG. 3A is a longitudinal cross-sectional view showing the structure of the acceleration sensor 3. FIG. 3B is a plan view of the acceleration sensor 3. As shown in FIG. 3A, an oxide film is formed as a protective film 10 on a glass substrate 9 to a thickness of, e.g., about 100 nm by CVD (chemical vapor deposition). A stacked gate electrode composed of a phosphorus-doped polysilicon gate electrode 11 and a Cr (chromium) gate electrode 12 is then continuously formed and patterned into a predetermined shape by a photoresist step and an etching step. An oxide film that is, e.g., 100 nm thick is then formed as an interlayer film 13 on the Cr gate electrode 12 using CVD. ITO (indium tin oxide), which is used to form the upper electrode 14, is next formed to a thickness of, e.g., 50 nm by sputtering, and then patterned by a photoresist step and an etching step. The interlayer film between the Cr gate electrode 12 and the upper electrode 14 is next removed by a photoresist step and an etching step, and a gap is formed between the electrodes. A conductor composed of a hard material that is not readily susceptible to plastic deformation is used as the upper electrode; and Cr, Mo (molybdenum), a compound thereof, or the like may be used.

As shown in FIG. 3B, an upper electrode 14 composed of a capacitive electrode part 16 and a lead part 15 is disposed on the Cr gate electrode 12, and a gap is formed between the electrodes by the interlayer film removal region 17. A structure can be adopted for the upper electrode 14 in which the lead part 15 of the upper electrode is readily bent in one layer, the capacitive electrode part 16 of the upper electrode is given a two-layer structure and increased in weight, and the gap between the electrodes is readily changed according to the degree of acceleration, so that a predetermined acceleration can be obtained.

The operation of the pressure sensor according to the present embodiment is described hereunder. As described above, a lower capacitive electrode 2 and a capacitive electrode 6 for the opposite substrate are provided to the pressure sensor on the facing surfaces of the TFT substrate 1 and the opposite substrate 5, respectively, and the space between the lower capacitive electrode 2 and the capacitive electrode 6 is sealed by a seal member 7 disposed around the periphery of the lower capacitive electrode 2 and the capacitive electrode 6. The lower capacitive electrode 2 and the capacitive electrode 6 of the opposite substrate are separated by this seal member 7 at a predetermined gap. When pressure is applied to the opposite substrate 5 from the exterior, the distance between the electrodes changes due to the bending of the electrodes, and the capacitance also changes accordingly. The pressure sensor measures the pressure from this variation in the capacitance. The acceleration sensor 3 measures the acceleration by detecting capacitance variations due to changes in the distance between the upper electrode 14 and the Cr gate electrode 12 when the upper electrode 14 bends due to the acceleration.

The effect of the present embodiment shall next be described. As described above, the acceleration sensor is incorporated in the pressure sensor of the present embodiment. In addition, circuit elements and a detecting element are formed on the inner surface of the TFT substrate 1. For this reason, the acceleration sensor, TFT, circuit elements, and detection circuit are sealed inside the pressure sensor and therefore have significantly better moisture resistance.

In the present embodiment, the substrate to which the lower capacitive electrode 2 is provided is a TFT substrate, but a substrate on which only the pressure sensor is formed may also be used. In this case, a terminal part for connecting to the exterior is provided to the substrate on which the lower capacitive electrode 2 is formed. Even if a TFT substrate is used, the terminal part is provided in the same manner if the TFT substrate must be connected with an external circuit.

Figure 4:
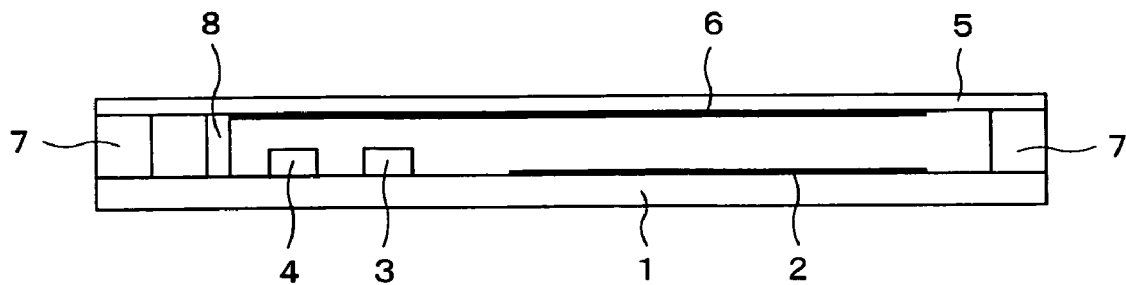
FIG. 4 is a longitudinal cross-sectional view showing a pressure sensor according to a second embodiment of the present invention.
Figure 5A:
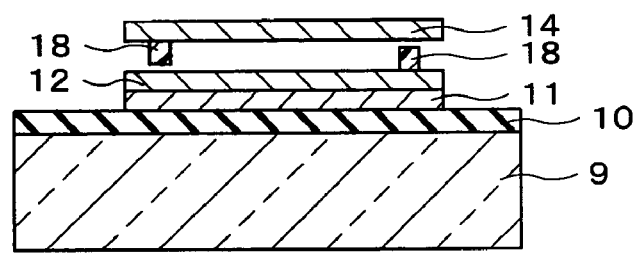
FIG. 5A is a longitudinal cross-sectional view showing the temperature sensor shown in FIG. 4.
Figure 5B:
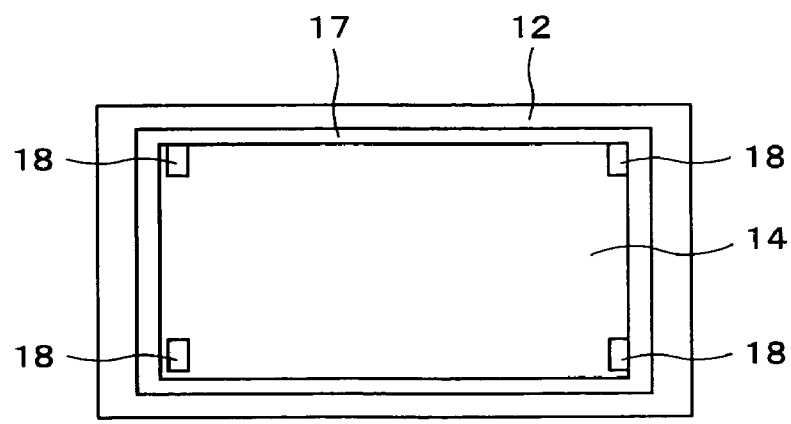
FIG. 5B is a plan view of this temperature sensor.

A second embodiment of the present invention shall next be described. FIG. 4 is a longitudinal cross-sectional view showing a pressure sensor according to the present embodiment. FIG. 5A is a longitudinal cross-sectional view showing the temperature sensor shown in FIG. 4. FIG. 5B is a plan view of this temperature sensor. As shown in FIG. 4, the pressure sensor according to the present embodiment differs from that of the first embodiment in that a temperature sensor 4 is provided to the TFT substrate 1. The configuration of the present embodiment is the same as the first embodiment in all other respects.

The configuration of the temperature sensor 4 shall next be described. As shown in FIGS. 5A and 5B, the temperature sensor is formed through the same process as the acceleration sensor described above. The temperature sensor differs in that a gap is formed between the upper electrode 14 and the Cr gate electrode 12 by placing spacers 18 at the four corners of the upper electrode 14. The spacers 18 are composed of an acrylic resin having a height of, e.g., about 2 μm and are formed through application, a photoresist step, and a baking step. The operation of the present embodiment is substantially the same as the first embodiment described above. The temperature sensor detects the temperature in the same manner as that of the acceleration sensor by detecting variation in capacitance due to the electrode gap being changed by variation in temperature. The effect of the present embodiment is the same as the effect of the first embodiment. The acceleration sensor and temperature sensor are sealed and disposed within the pressure sensor, and the moisture resistance of the sensors is therefore improved.

Figure 6A:
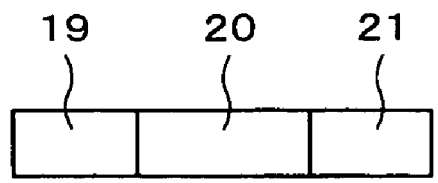
FIG. 6A is a longitudinal cross-sectional view showing a temperature sensor of a modified example of the second embodiment.
Figure 6B:
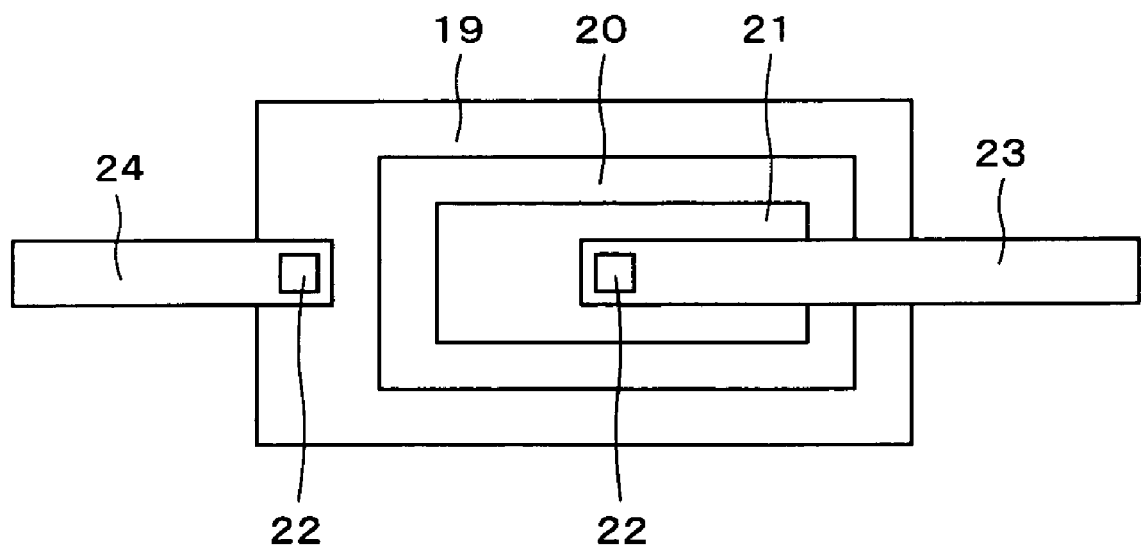
FIG. 6B is a plan view of this temperature sensor.

A modified example of the second embodiment shall be described hereunder. The configuration of the present modified example is the same as that shown in FIG. 4. The present modified example differs from the second embodiment in that a diode is used as the temperature sensor 4, as shown in FIG. 6. FIG. 6A is a longitudinal cross-sectional view showing the configuration of the temperature sensor 4 in the present modified example, and FIG. 6B is a plan view of the temperature sensor. The configuration of the temperature sensor 4 of the present modified example shall next be described. As shown in FIGS. 6A and 6B, a P region 20 is formed within an N+ region 19, while a P+ region 21 is formed within the P region 20. These regions are formed through a photoresist step and a phosphorus- and boron-doping step. The P region 20 is effective in preventing leakage at the joins of the diode. The regions are crystallized through ELA (excimer laser annealing); an SiN (silicon dioxide) passivation film is then formed by CVD to a thickness of, e.g., about 20 nm; a contact 22 is formed; and the regions are subsequently patterned into the form of an anode 23 and a cathode 24. The operation of the temperature sensor of the present modified example is different from the operation of the temperature sensor of the second embodiment. The temperature is detected using the temperature dependency ($\Delta Vf \square 2$ (mV/° C.)) of the reduction in voltage in the forward direction (Vf) of the pn junction diode. The operation of the present modified example is the same as the operation of the second embodiment described above in all other respects. The effect of the present modified example is also the same as the effect of the second embodiment described above.

The present invention can be suitably used in TPMS sensors and the like.

What is claimed is:

1. A pressure sensor comprising:
    a first substrate;
    a second substrate disposed facing the first substrate;
    a seal member for sealing from the exterior a space between the first substrate and second substrate;
    first and second electrodes which are formed on the facing surfaces of the first substrate and second substrate, respectively, and which detect pressure applied to the first and second substrates as a variation in capacitance; and
    an acceleration sensor formed on a surface facing an area surrounding the seal member of the first and second substrates;
    wherein the first or second substrate is a substrate on which a circuit element and a detection circuit are formed.

2. The pressure sensor of claim 1, wherein the first or second substrate is a substrate on which a circuit element having a TFT is formed.

3. The pressure sensor of claim 2, wherein the acceleration sensor is formed on the substrate on which the circuit element having the TFT is formed.

4. A pressure sensor comprising:
    a first substrate;
    a second substrate disposed facing the first substrate;
    a seal member for sealing from the exterior a space between the first substrate and second substrate;
    first and second electrodes which are formed on the facing surfaces of the first substrate and second substrate, respectively, and which detect pressure applied to the first and second substrates as a variation in capacitance; and
    an acceleration sensor formed on a surface facing an area surrounding the seal member of the first and second substrates;
    wherein a temperature sensor is formed on a facing surface of the first or second substrate in an area surrounded by the seal member.

5. The pressure sensor of claim 4, wherein the substrate on which the temperature sensor is formed is a substrate on which a circuit element having a TFT is formed.

* * * * *